(12) United States Patent
Brostmeyer

(10) Patent No.: US 8,136,358 B1
(45) Date of Patent: Mar. 20, 2012

(54) HEAT RESERVOIR FOR A POWER PLANT

(75) Inventor: Joseph Brostmeyer, Jupiter, FL (US)

(73) Assignee: Florida Turbine Technologies, Inc., Jupiter, FL (US)

( * ) Notice: Subject to any disclaimer, the term of this patent is extended or adjusted under 35 U.S.C. 154(b) by 557 days.

(21) Appl. No.: 12/470,564

(22) Filed: May 22, 2009

(51) Int. Cl.
F01K 25/02 (2006.01)
F01K 1/00 (2006.01)
F02C 1/04 (2006.01)

(52) U.S. Cl. ............................... 60/683; 60/659; 60/684

(58) Field of Classification Search .................... 60/659, 60/682–684; 165/9.1–9.4, 10, 112, 113, 165/115–117, 104.15, 168–171, 185
See application file for complete search history.

(56) References Cited

U.S. PATENT DOCUMENTS

| 2,478,851 | A | 8/1949 | Traupel |
| 4,275,562 | A | 6/1981 | Fejer |
| 4,326,382 | A | 4/1982 | Baardson |
| 4,475,343 | A | 10/1984 | Dibelius et al. |
| 4,479,355 | A | * | 10/1984 | Guide et al. .................... 60/683 |
| 4,727,930 | A | 3/1988 | Bruckner et al. |
| 5,255,507 | A | * | 10/1993 | Gounder ...................... 60/39.12 |
| 6,629,413 | B1 | 10/2003 | Wendt et al. |
| 7,444,818 | B1 | 11/2008 | Brostmeyer |

* cited by examiner

Primary Examiner — Thomas Denion
Assistant Examiner — Christopher Jetton
(74) Attorney, Agent, or Firm — John Ryznic

(57) ABSTRACT

A heat reservoir for use in a power plant that burns a dirty fuel such as coal to absorb the heat from the resulting dirty hot gas flow. The heat reservoir includes a number of heat absorbing walls that form dirty hot gas flow passages and clean hot gas flow passages. Cross-over holes are formed in the walls to equalize pressure. The dirty hot gas flow is passed though the dirty passages to heat up the walls. When the heat absorbing walls have absorbed enough heat, the dirty hot gas flow is stopped and compressed air is passed through the clean passages to absorb heat from the walls and is then passed through a turbine to drive an electric generator. The heat reservoir is then recharged again by passing the dirty hot gas flow through the dirty passages to recharge the walls.

5 Claims, 5 Drawing Sheets

HEAT RESERVOIR FOR A POWER PLANT

BACKGROUND OF THE INVENTION

1. Field of the Invention

The present invention relates to an indirect fired Brayton cycle turbine driven power plant, and more specifically to one that burns a dirty fuel like coal or bio-mass.

2. Description of the Related Art Including Information Disclosed Under 37 CFR 1.97 and 1.98

A Brayton cycle turbine engine is a very efficient converter of fuel to energy, and is typically powered by natural gas or a liquid fuel. Coal burning power plants burn coal, the coal being a very cheap source of energy but also contains residue from the combustion process that would damage a turbine if used in the Brayton cycle turbine power plant. Brayton cycle turbine power plants in the past have used heat from burning coal to heat the gas supplied to the turbine, but through a heat exchanger such that the residue from burning coal does not enter the turbine. This heat exchanger is not very efficient in transferring heat, and the maximum operating temperature is limited to what the heat exchanger materials can withstand. The efficiency of a Brayton cycle turbine increases as the temperature of the hot gas stream increases. Coal can burn to produce a very hot gas stream. However, modern day materials used to make heat exchangers cannot withstand this high temperature. Oil based fuels are burned for use in driving Brayton cycle turbines, but the cost of oil based fuels have increased in recent years. Coal is a very abundant and relatively cheap fuel.

U.S. Pat. No. 7,444,818 issued on Nov. 4, 2008 to Brostmeyer and entitled BATCH FIRED HEAT RESERVOIRS discloses a power plant that burns a dirty fuel such as coal to generate heat that is used to drive a turbine and produce electric power, the entire disclosure being incorporated herein by reference. The power plant includes two heat reservoirs that are connected in series so that while the first heat reservoir is being charged with heat, the second heat reservoir is supplying the hot gas flow to the turbine. When the second heat reservoir has been discharged of its stored heat and the first heat reservoir has been recharged with heat, the two are switched so that the newly charged heat reservoir will supply the hot gas flow to the turbine. With this system, the impurities contained in the flue gas (hot gas flow) produced by burning the coal can passed through a turbine to produce electric power. The present invention is an improvement in the heat reservoirs used in this patented invention.

It is therefore an object of the present invention to provide for a power plant that makes use of the very high energy conversion of a Brayton cycle turbine with the relatively cheap and abundant use of coal as the heat producing fuel.

It is another object of the present invention to make use of a dirty fuel like coal or bio-mass that can burn at a very high temperature, and use the heated air in a Brayton cycle turbine for producing power.

It is another object of the present invention to provide for a heat reservoir that will not discharge contaminants in the hot gas flow that will be passed through a turbine.

BRIEF SUMMARY OF THE INVENTION

The present invention allows for a Brayton cycle turbine power plant to be supplied with heat generated from burning of coal without using a heat exchanger. The present invention makes use of two heat reservoirs arranged in parallel. One heat reservoir absorbs heat from the coal burning process while the other heat reservoir gives off its stored heat to the Brayton cycle turbine system to power the turbine. When the one heat reservoir has stored enough heat from the burning coal, it is then used to supply the heat for the Brayton cycle turbine system while the other heat reservoir is recharged at the same time. This way, the turbine is operated continuously and one of the heat reservoirs is always receiving heat from the coal burning process. Also, a higher gas stream temperature can be supplied to the turbine than would be available through a conventional heat exchanger. Higher power plant efficiency can be achieved using a low price source of energy (coal or bio-mass).

DETAILED DESCRIPTION OF THE INVENTION

Figure 1:
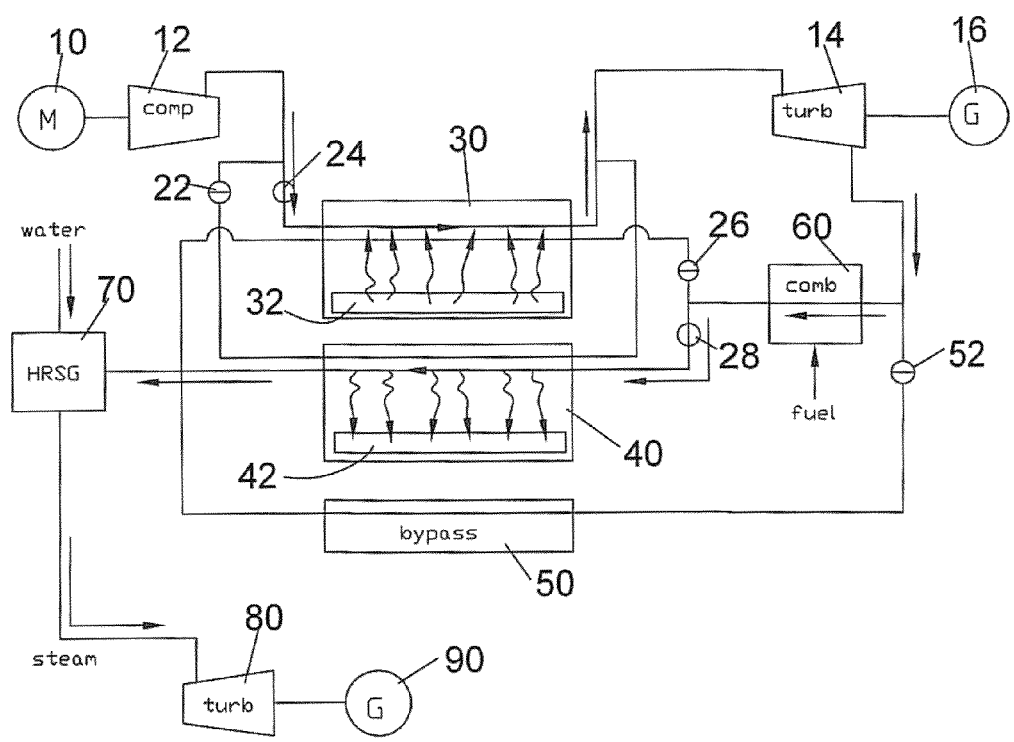
FIG. 1 shows a schematic diagram of a turbine being supplied with heat from a first batch fired heat exchanger while a second and parallel batch fired heat exchanger is supplied with heat from a combustion process.

FIG. 1 shows a power plant that burns a dirty fuel, such as coal, which used to drive a turbine to produce electrical power. The hot gas from the furnace is used to charge a heat reservoir and then, after it is charged is used to supply a clean hot gas flow to the turbine. FIG. 1 shows a furnace or combustor 60 that is used to burn a dirty fuel, such as coal, to produce a hot gas flow. The dirty hot gas flow is passed through one of two heat reservoirs 30 and 40 to charge the heat reservoir. The power plant further includes two control valves 26 and 28 to direct the dirty hot gas flow into one of the two heat reservoirs 30 and 40. A heat recovery steam generator 70 is used to pass the exhaust flow from the charging heat reservoir to produce steam from water and drive a turbine 80 that drives an electric generator 90. An electric motor 10 drives a compressor 12 to sent a high pressure flow through the heat reservoir 30 or 40 to pick up heat that is then passed through a turbine 14 that drives another electric generator 16 to produce electrical power. Two control valves 22 and 24 direct the compressed air into the heat reservoir that is charged. Thus, in FIG. 1 the second heat reservoir is being charged with the dirty hot gas flow from the combustor 60 with the exhaust being passed into the HRSG 70 to produce steam to drive the turbine 80. The compressed air from the compressor 12 is passed through the first heat reservoir 30 that has been previously charged with the dirty hot gas flow from the combustor 60 and thus picks up the heat from the heat absorbing walls 32 or 42 to pass a clean hot gas flow into the turbine 14 and drive the generator 16.

Figure 2:
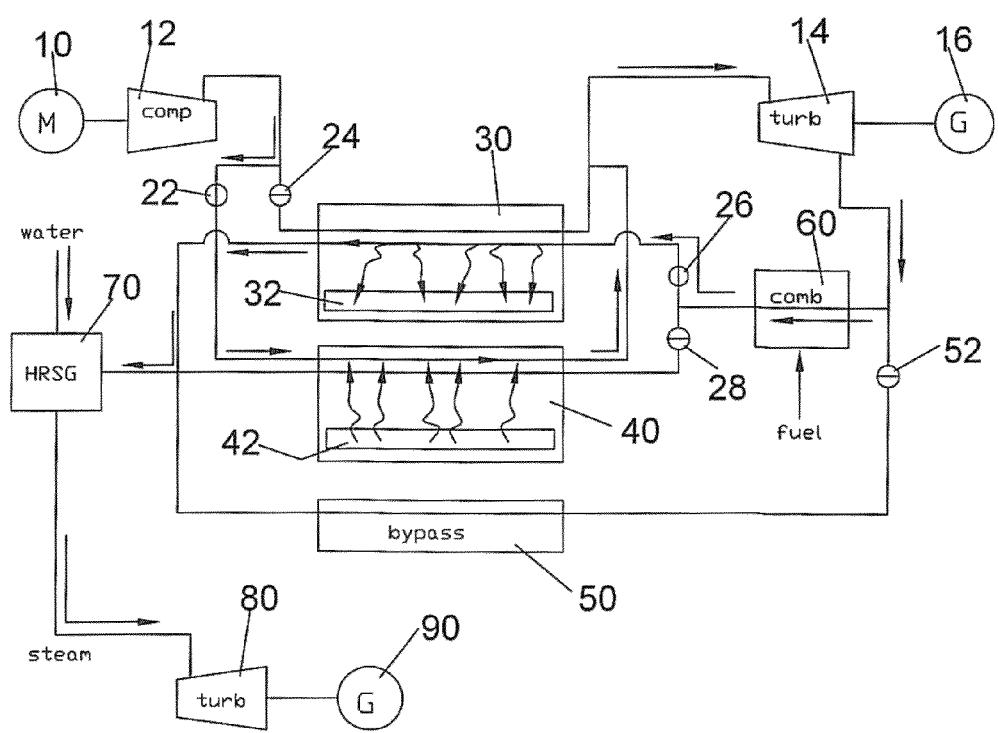
FIG. 2 shows a schematic diagram of the turbine being supplied with heat from the second batch fired heat exchanger while the first batch fired heat exchanger is re-supplied with heat from the combustion process.

When the second heat reservoir 40 has been adequately charged with heat and the first heat reservoir 30 has been drained of heat, the control valves 26, 28, 22 and 24 are switched over to that shown in FIG. 2 so that the first heat reservoir 30 is now being charged with the dirty hot gas flow from the combustor 60 while the compressed air from the compressor 12 flows through the second heat reservoir 40 to heat up the clean hot gas flow that is then passed into the turbine 14 to drive the generator 16.

Figure 3:
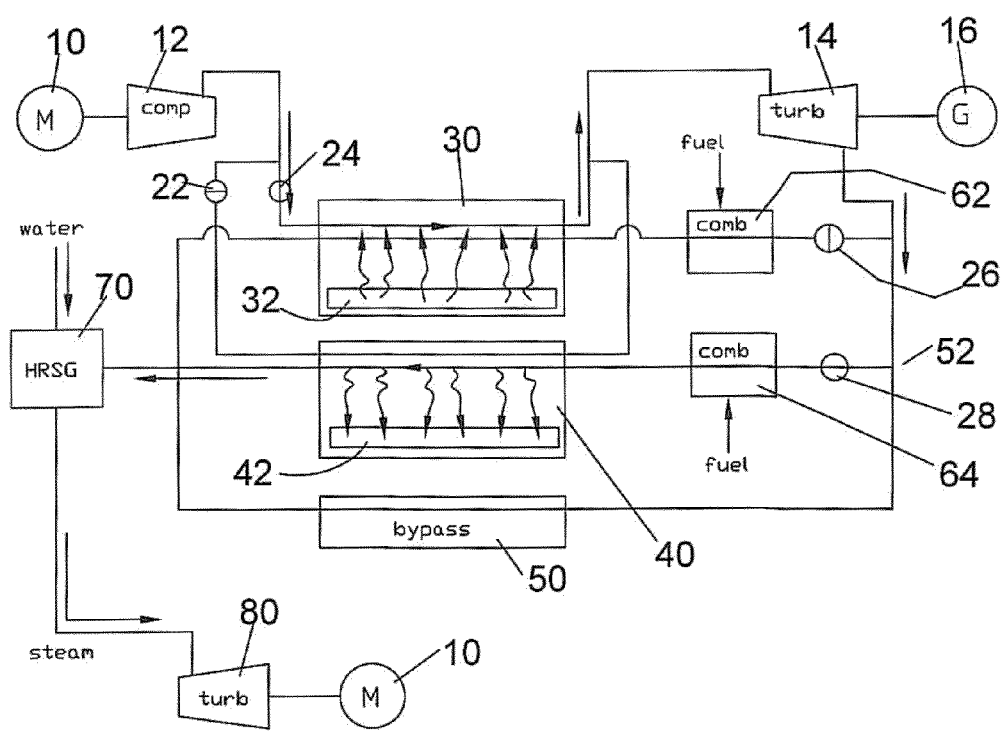
FIG. 3 shows a schematic diagram of a second embodiment of the power plant system where two combustors are used instead of a single combustor and the second turbine is used to drive the compressor of the first turbine system.

FIG. 3 shows an additional embodiment in that each heat reservoir 30 and 40 includes a separate furnace or combustor 62 and 64 to pass a dirty hot gas flow into the respective heat reservoir 30 and 40. In both embodiments of FIGS. 1-3, a bypass 50 is used to pass the turbine 14 exhaust into the HRSG and bypass the combustor 60 or combustors 62 and 64. A control valve 52 controls this turbine exhaust flow.

Figure 4:
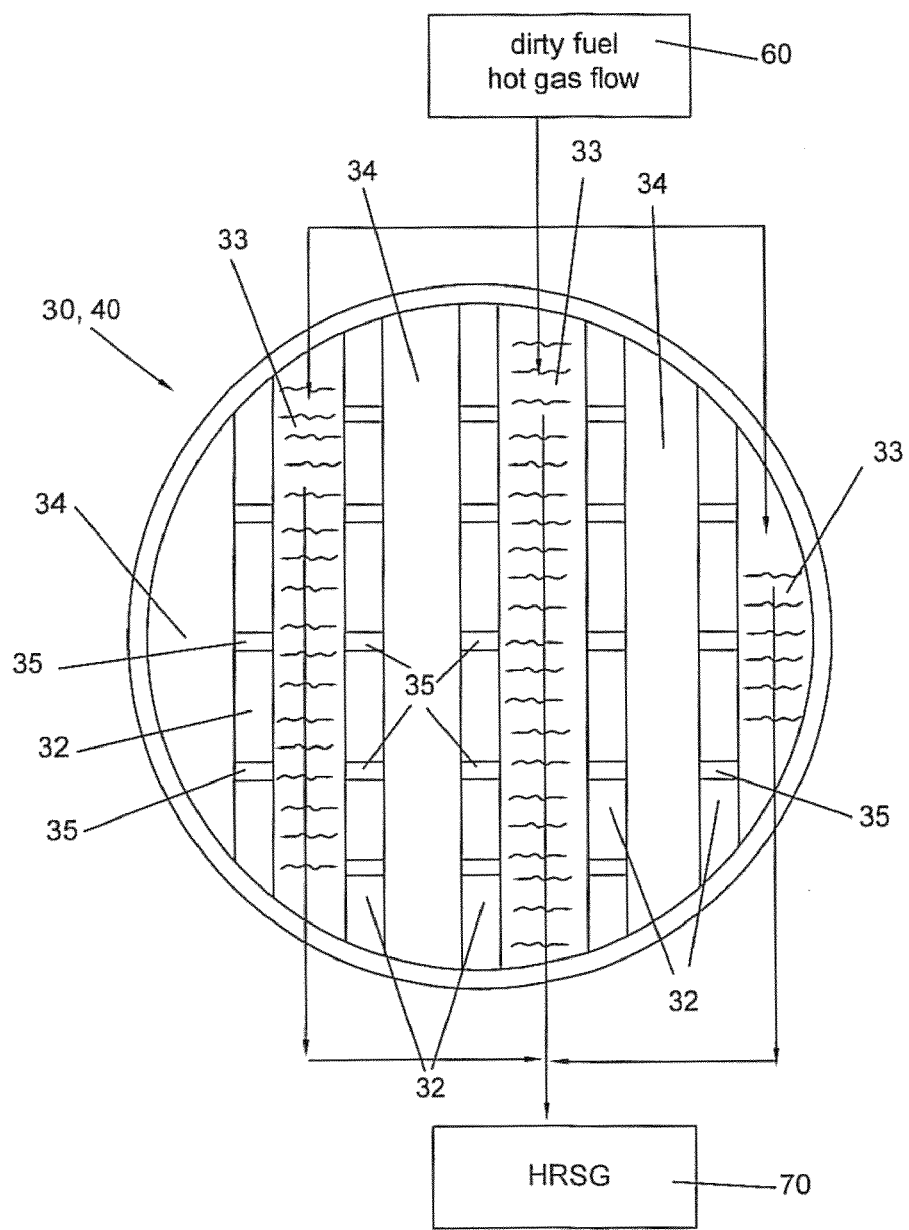
FIG. 4 shows a front view of a heat reservoir under high pressure used the power plant system of FIGS. 1-3.

FIG. 4 shows a front view of one of the heat reservoirs 30 and 40 which each have the same structure. The heat reservoir includes an outer wall that forms a rigid structural support for the high pressure that will be passed through the heat reservoir from the compressor 12. The heat reservoir in the present invention is around 10 feet in diameter and around 100 feet in length. The heat reservoir includes a number of heat absorbing walls 32 that extend in a vertical direction and separate a dirty hot gas passage 33 from a clean hot gas passage 34. In other embodiments, the heat absorbing walls can be oriented in other directions such as horizontal or anywhere in-between the vertical and horizontal directions. In the present invention, five such walls 32 are used that form three dirty hot gas flow passages 33 and three clean hot gas flow passages 34. However, more or less walls 32 can be used without parting from the spirit or scope of the invention. The heat absorbing walls 32 extend from the bottom surface of the heat reservoir to the top surface to form separate passages, and extend from the inlet end to the outlet end of the heat reservoir. The thickness of the heat absorbing walls 32 will depend upon the material used and the heat transfer rate of the material. The heat reservoirs (30, 40) are lined on the inner surfaces with firebrick or other heat resistant materials to limit heat loss from inside to outside of the reservoirs.

The dirty and clean passages are connected to one another by a number of weep holes or cross-over holes 35 that limit the mixing of the dirty flow with the clean flow but equalize the pressure acting on the wall 32. When the clean hot gas flow is passing through the clean passage 34 and the dirty hot gas flow is passing through the dirty passage 33, the pressure acting on the wall 32 will be great. The purpose of the weep holes or cross-over holes 35 is to limit the pressure differential so that the heat absorbing walls 32 do not need to be so thick for structural rigidity purpose. The equalization of the pressures across the walls 32 will allow for the heat reservoir to be used with the high pressure clean hot gas flow and the low pressure dirty hot gas flow.

The heat absorbing walls 32 are made from aluminum oxide, SiC or other materials that can absorb heat and hold it while being capable of withstanding the extreme temperature of the dirty hot gas flow from the furnace or combustor 60. The heat absorbing walls 32 should be capable of withstanding the extremely high temperatures and the corrosive environment due to the burning of the dirty fuel. The heat absorbing walls 32 can also be hollow walls with a phase change material occupying the hollow space. The cross-over holes equalize the pressure acting on both sides of the heat absorbing wall. By equalizing the pressure, the applicant means that the pressure differential can be zero or as close to zero as possible so that the small differential pressure will not cause over-stress of the heat absorbing wall.

Figures 5, 6:
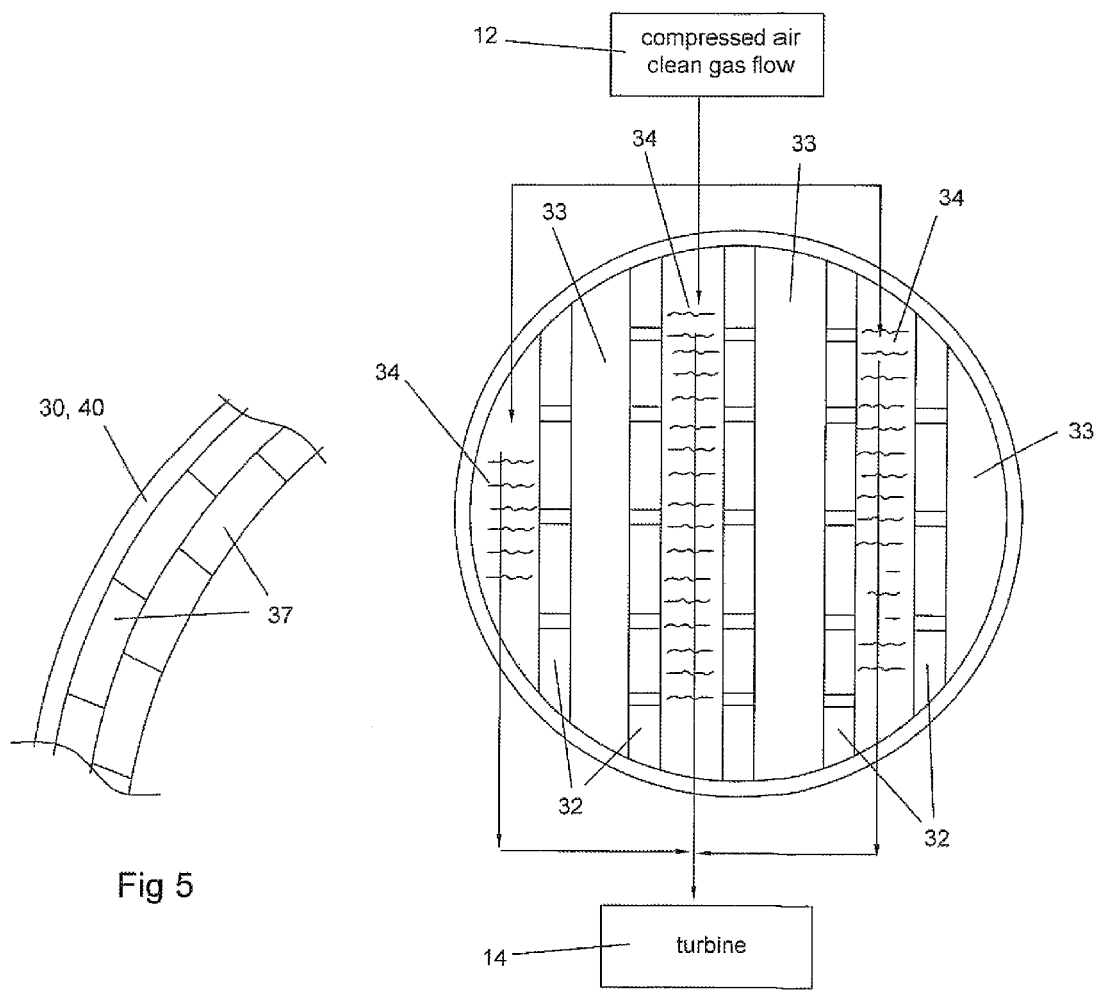
FIG. 5 shows a detailed view of the heat reservoir wall from FIG. 4.
FIG. 6 shows a front view of the heat reservoir under low pressure used in the power plant system of FIGS. 1-3.

FIG. 5 shows a detailed view of a section of the outer wall in the heat reservoir which includes an outer wall 36 made from a high strength material such as steel that can contain the high pressure of the compressed air from the compressor 12. The inner surface of the outer wall 36 is lined with fire brick 37 to protect the outer wall 36 from the extreme heat of the dirty hot gas flow from the combustor 60.

FIG. 4 shows the heat reservoir receiving the dirty hot gas flows from the combustor 60 passing through the dirty passage 33 so that the heat will be absorbed into the two adjacent walls 32. The dirty hot gas flow will pass through the heat reservoir from one end to the opposite end and then through the HRSG 70. The FIG. 4 flow represents the low pressure flow in that the dirty hot gas flow is at relatively low pressure compared to the compressor outlet flow. The weep holes or cross-over holes 35 equalize the pressure across the heat absorbing walls 32.

At the same time that one of the heat reservoirs is being charged under the relatively low pressure, the compressed air from the compressor 12 is passed through the other heat reservoir through the clean hot gas flow passages as seen in FIG. 6 and then into the turbine 14 to recover the heat absorbed and stored within the walls 32 and pass the clean hot gas flow into the turbine 14 to drive the generator. This represents the relatively high pressure operation of the heat reservoir for when the compressed air from the compressor is passed through the clean passages to remove the stored heat from the heat absorbing walls. The weep holes 35 allow for the pressure across the walls to equalize in this high pressure environment.

Thus, the heat reservoir of the present invention can be used under both the low pressure and the high pressure environments as described above, and can be used to pass the dirty hot gas flow through a separate passage from the clean hot gas flow so that any dirt or other particulates that are in the dirty hot gas flow will not be picked up by the clean hot gas flow and passed into the turbine 14. the problem discovered in the prior art invention (U.S. Pat. No. 7,444,818) is that the containments from the dirty hot gas flow that is left on the heat reservoirs will be picked up when the compressed air from the compressor passes through the heat reservoir at the later stage when most of the heat has been recovered by the compressed air. Thus, to prevent contaminants from passing into the turbine 14, the dirty flow passage must be separate from the clean flow passage. Since two separate passages are used in which the dirty flow passage operates and a relatively low pressure while the clean flow passage operates at a relatively high pressure, some sort of pressure equalizing means is required so that the heat absorbing walls do not need to be reinforced but can operate under relatively small differential pressures acting on the two faces of the wall 32.

Thus, in operation the power plant of FIG. 1 would include two identical heat reservoirs with the heat absorbing walls forming a number of clean hot gas flow passages and an equal number of dirty hot gas flow passages with the weep holes connecting the clean passage to the dirty passage. The weep holes are of such numbers and of such size in diameter that the pressure across the wall is equalized to a level so that the wall does not require structural support for the pressure differential and so that the amount of dirty flow will not be large enough to pollute the clean gas flow. Once the pressure across the wall is equalized by the weep holes or cross-over holes 35, no further flow from the high pressure side to the low pressure side of the wall will occur. Also, since the clean hot gas flow is the higher pressure, if any cross flow through the weep holes occurs, it will be from the clean flow passage to the dirty flow passage.

The dirty hot gas flow from the combustor 60 will pass through one heat reservoir and through the dirty passages to charge the heat absorbing walls 32 with enough heat. The dirty hot gas exhaust is passed through the HRSG to produce steam that drives the turbine 80 that drives the electrical generator 90. while this is occurring, clean compressed air under relatively high pressure (when compared to the dirty hot gas flow) from the compressor 12 is passed through the other heat reservoir that has been previously charged so that the clean compressed air will absorb heat from the heat absorbing walls 32 that is then passed through the turbine 14 to drive generator 16 and produce electric energy. The clean high pressure hot gas flow passes through the clean passages and the weep holes then equalize the pressure across the walls 32 by passing enough clean high pressure air into the dirty passages so that the walls 32 are not under a high differential pressure.

I claim the following:

1. A process for producing electric power from burning a dirty fuel comprising the steps of:
   combusting a dirty fuel to produce a dirty hot gas flow;
   passing the dirty hot gas flow through a dirty passage formed on one side of a heat absorbing wall so that the heat absorbing wall will absorb heat;
   when the heat absorbing wall has absorbed a certain amount of heat, passing a clean compressed air through a clean passage formed on an opposite side of the heat absorbing wall so that the clean compressed air will absorb heat from the heat absorbing wall to produce a clean hot gas flow;
   equalizing a pressure across the heat absorbing wall during the passing of the dirty hot gas flow and the clean hot gas flow through the clean and dirty passage; and,
   passing the clean hot gas flow through a turbine that drives an electric generator to produce electric power.

2. The process for producing electric power of claim 1, and further comprising the steps of:
   passing the dirty hot gas flow through a plurality of dirty passages formed by a plurality of heat absorbing walls; and,
   equalizing a pressure across the heat absorbing walls during the passing of the dirty hot gas flow and the clean hot gas flow through the clean and dirty passages; and,
   passing the clean compressed air through a plurality of clean passages formed by the heat absorbing walls.

3. The process for producing electric power of claim 1, and further comprising the step of:
   producing the dirty hot gas flow from burning coal.

4. The process for producing electric power of claim 1, and further comprising the step of:
   discharging the dirty hot gas flow from the heat absorbing wall into a heat recovery steam generator to produce a hot steam flow.

5. The process for producing electric power of claim 1, and further comprising the step of:
   after the clean hot gas flow has absorbed a certain amount of heat from the heat absorbing wall, stopping the flow of clean compressed air and passing the dirty hot gas flow over the heat absorbing wall to reheat the heat absorbing wall.

\* \* \* \* \*